Oct. 9, 1962 R. A. JEWELL 3,057,641
VEHICLE SUSPENSION
Filed July 6, 1960 3 Sheets-Sheet 1

INVENTOR
Robert A. Jewell

BY Mason, Fenwick & Lawrence
ATTORNEYS

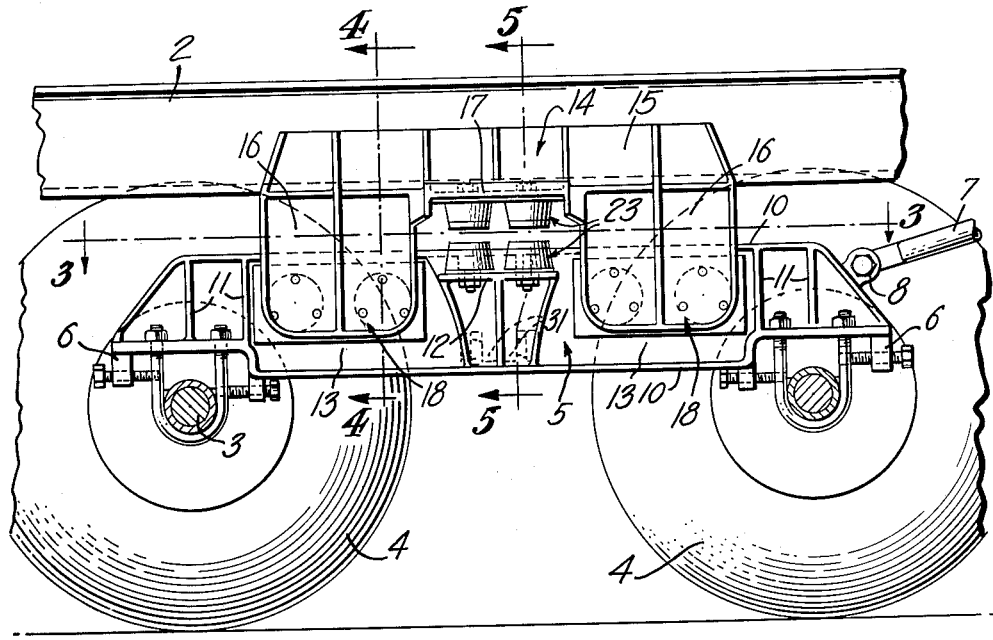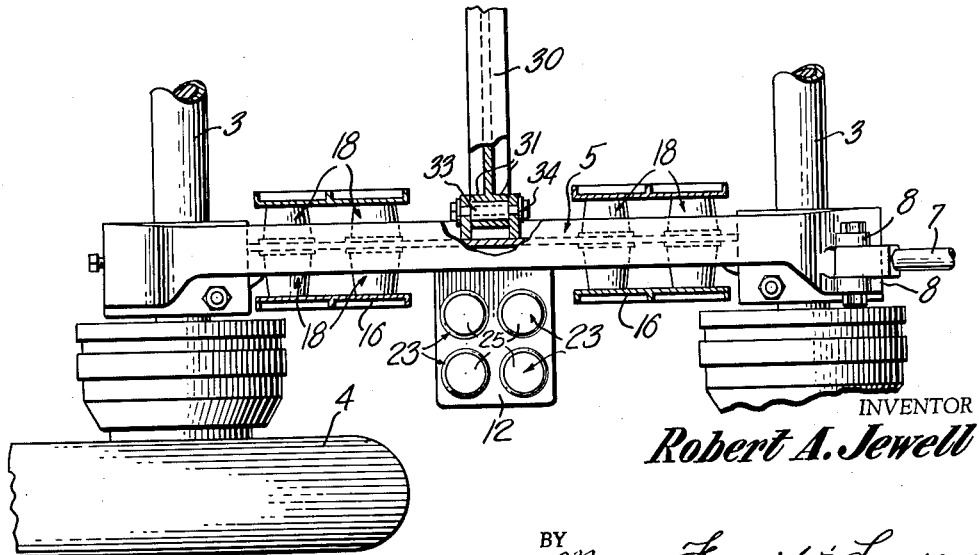

Oct. 9, 1962 R. A. JEWELL 3,057,641
VEHICLE SUSPENSION
Filed July 6, 1960 3 Sheets-Sheet 3
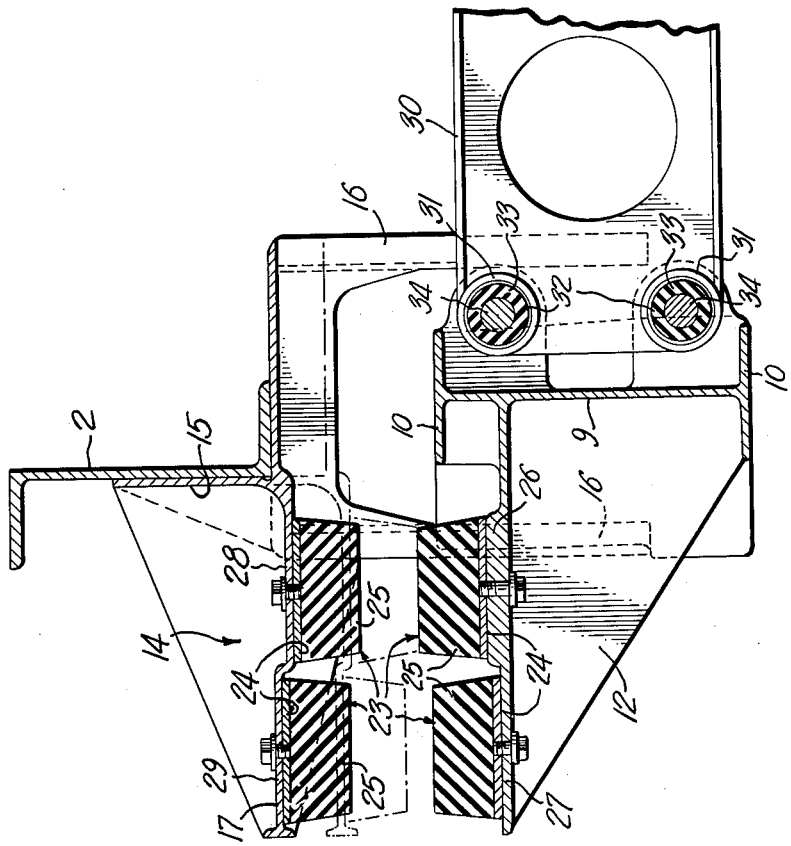
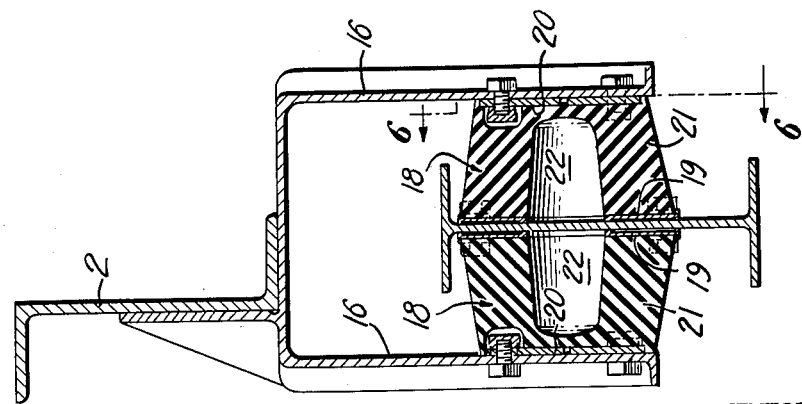
INVENTOR
Robert A. Jewell
BY Mason, Fenwick & Lawrence
ATTORNEYS United States Patent Office 3,057,641
Patented Oct. 9, 1962

3,057,641
VEHICLE SUSPENSION
Robert A. Jewell, P.O. Box 1159, Savannah, Ga.
Filed July 6, 1960, Ser. No. 41,112
8 Claims. (Cl. 280—104.5)

This invention relates to suspension means for vehicles, and particularly to complete rubber suspensions wherein rubber forms the sole means for supporting the vehicle frame and body upon the running gear.

It has been conventional practice in vehicle construction to suspend the vehicle frame above the running gear by means of leaf, coil, or other metallic springs which have a fixed spring rate. Such arrangements do not provide compensation for load variation, but require the use of springs designed to take the heaviest load to be carried. Consequently the springs are too stiff to provide for proper riding qualities when the vehicle is unloaded, or under light load. Pneumatic and hydraulic arrangements have been proposed, and these can in some cases provide compensation for load, but leakage in any part of the system brings about complete spring failure.

In suspending heavy duty vehicles, it has been customary to mount the axles in pairs in tandem, and through pivoted rocker arms transfer load from one axle to the other of the pair so as to equalize the load and reduce road shocks to the vehicle. These constructions also have required the use of conventional spring means with their attendant disadvantages.

The general object of the present invention is to provide an improved suspension means for vehicles which is a complete rubber suspension, and will eliminate many of the defects of prior suspension systems.

A more specific object of the invention is to provide a rubber suspension system which combines the functions of rubber elements in shear and in compression to obtain a smoother-acting, self-compensating unit.

Another object is the provision of such a system, particularly adapted to tandem mounting, wherein the conventional pivoted rocker arm is eliminated.

A further object is to provide a system of this kind having rubber suspension means arranged to become operative in sequence as the load increases.

Yet another object is the provision of a rubber suspension having a plurality of suspension units arranged for sequential operation in a predetermined order, which provides an increased width suspension base as the load increases.

A still further object is to provide a complete rubber suspension having means to serve as efficient overturn and sway deterrent means.

Other objects of the invention will become apparent from the following description of one practical embodiment thereof when taken in conjunction with the drawings which accompany, and form part of, this specification.

In the drawings:

FIGURE 2 is a vertical section taken on the line 2—2 of FIGURE 1, illustrating the running gear and suspension in side elevation;

FIGURE 3 is a horizontal section taken on the line 3—3 of FIGURE 2;

FIGURE 4 is a vertical, transverse section taken on the line 4—4 of FIGURE 2, showing the mounting and arrangement of the shear members of the unit;

FIGURE 5 is another vertical transverse section taken on line 5—5 of FIG. 2 illustrating the compression members of the system and the connection of the cross-tie to the tandem axle connecting beam.

Figure 1:
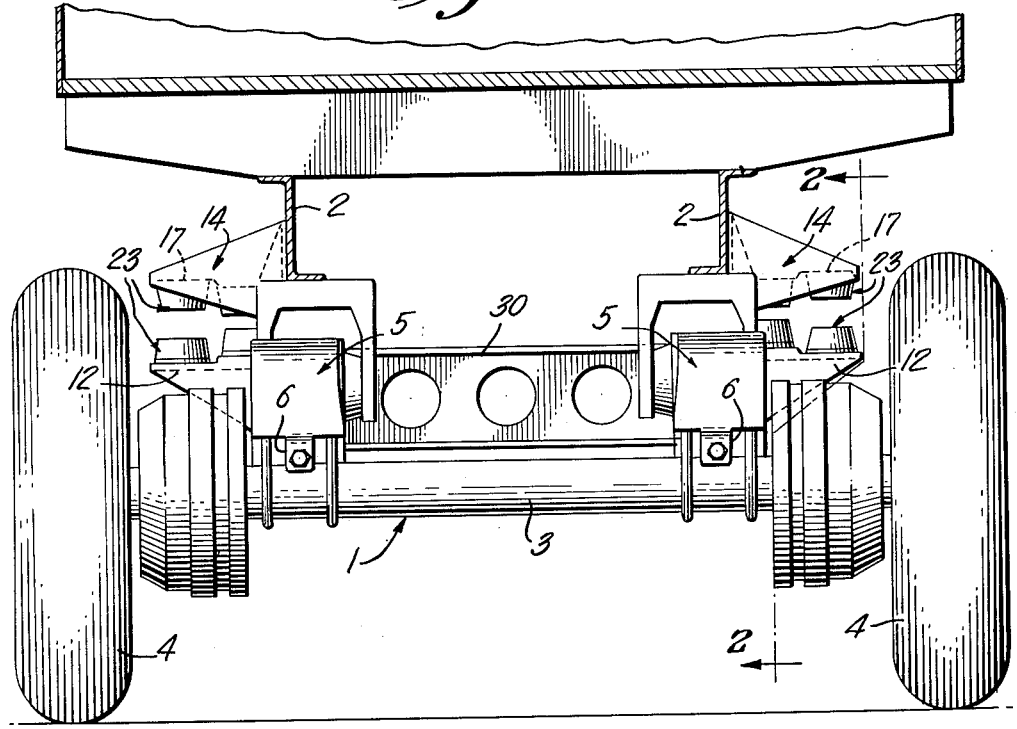
FIGURE 1 is a rear view of a portion of a vehicle, illustrating the frame and running gear, with improved suspension means constructed in accordance with the present invention mounted thereon.
Figure 6:
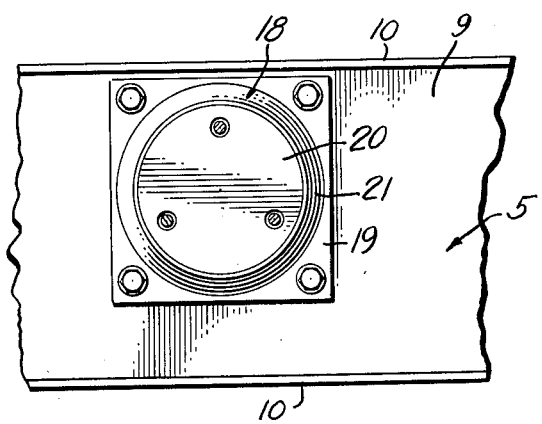
FIGURE 6 is a sectional view, taken on the line 6—6 of FIGURE 4, showing the face of one of the shear members used in the suspension.

In general, the invention concerns a complete rubber suspension system for vehicles wherein the unloaded weight of the vehicle frame and body is suspended upon rubber mounting members which carry the load in shear, and additional load causes compression members to come into action to assume a part of the load. A plurality of compression members are provided, and they are arranged to take up the load in sequence as the load increases. As the load increases, compression members spaced progressively farther from the vehicle centerline come into play to support it and to provide a wider support base. While the suspension is particularly adapted to use with tandem mounts, and is shown in that connection, it is not limited to such use.

Referring to the drawings in detail, there is shown a portion of the running gear 1 and frame 2 of a vehicle. The running gear includes a pair of axles 3, upon which are mounted wheels 4. The axles are coupled together near each end by means of connecting beams 5, which extend longitudinally of the vehicle. Any suitable means 6 may be used to secure the axles to the ends of the beams. The beams may be tied to the vehicle frame by means of conventional radius rods 7, pivotally attached to eyes 8 at one end of the beam.

The connecting beams may be cast or fabricated, and have flat, vertical, central webs 9 with peripheral flanges 10. Suitable bracing ribs 11 may be provided where necessary. A central bench 12 projects outwardly from the beam to provide a seat for certain of the suspension members. Flat, unobstructed areas 13 are present on either side of the bench 12 to provide a mounting area for other suspension members.

Mounting brackets 14 are fixed to opposite frame rails 2 to serve as companion members to the connecting beams. Each bracket includes a mounting plate 15 welded or otherwise secured, to the frame rail, and a pair of downwardly opening channels 16 whose legs straddle the connecting beams in the areas 13. Each bracket also has a central, outwardly projecting spring pad 17, substantially the size and shape of the connecting beam bench, adapted to overlie the bench. The pad will be adequately braced by suitable gussets, or ribs.

The connecting beams and companion mounting brackets on each side of the vehicle are interconnected by shear-mounted rubber spring units 18. These consist of bonded assemblies having steel end plates 19 and 20 bonded to the bases of frusto-conical rubber flexing elements 21. Plates 19 are bonded to the broader bases of the flexing elements, and plates 20 to the narrower bases. The flexing units are recessed, as at 22, in their broader ends to attain proper flexing under shear strains.

Shear units 18 are mounted in opposed pairs in the areas 13 of the connecting beams. Two of the units are connected back to back on opposite sides of the beams by having their plates 19 bolted to the beams. This places the broader bases of the opposed pair of adjacency. Two such pairs of units are shown in each of the areas 13 of the beams. The depending legs of the channels 16 of the mounting brackets 14 straddle the mounted units and are connected rigidly to the plates 20 of the units. Thus, the connecting beams and the mounting brackets will be coupled together through the intermediary of the shear units 18, and the connecting beams may move vertically within the channels of the mounting brackets by flexing the rubber elements of the suspension units 18.

The shear units 18 will be designed to take the empty weight of the vehicle, but as the vehicle is loaded the frame will drop lower in accordance with the amount of load. In order to prevent undue flexing of the units 18 and to hold the frame against undue lowering under load a plurality of rubber compression units 23 are used. These are to be mounted in pairs on the top of the benches 12 and on the undersides of the spring pads 17. There will be an inboard pair and an outboard pair on each bench and spring pad. The units on the benches and spring pads are mounted in vertical alignment, so that as the spring pads approach the benches under load, the units will contact one another and be compressed. Each of the units 23 comprises a mounting plate 24 and a rubber compression member 25 bonded to the plate. The mounting plates will be bolted, or otherwise attached, to the bench or pad.

In order to employ compression units of identical size throughout the suspension and yet obtain the desired progressive outward sequence of operation, the benches and the spring pads are stepped to provide spring seats of different height. The benches are thicker adjacent their connection to the body of the beam to provide raised seats 26 for the inboard compression units (see FIGURE 4), and lower seats 27 for the outboard units. The spring pads are offset to obtain the same result and provide seats 28 and 29. It will be clear, that on straight vertical movement of the beam toward and from the mounting bracket the inboard pair of units 23 will first come into contact and under compression, and when these have been compressed a predetermined amount the outboard pair will make contact and start into action.

To complete the running gear assembly and hold the axle connecting beams in proper alignment, a cross-tie 30 is used. This tie member extends transversely of the gear from one beam to the other centrally of the beams. The beam may take any desired shape, but is shown as having oppositely projecting mounting bosses 31 at its four corners to fit between pairs of spaced ears 32 projecting inwardly from the backs of the connecting beams. The openings 32 in the bosses are sufficiently large to receive rubber bushings 33 through which mounting pins 34 fit. It is contemplated that the engagement of the mounting pins with the bushings and the bushings with the bosses in which they are seated shall be such that turning of the pin will result in torsional twisting of the bushing to set up a torque tending to return the parts to original position. This arrangement allows some shifting movement of one axle connecting beam relative to the other and a more flexible spring operation.

As stated above, under most circumstances the suspension will be designed so that the shear spring units will support the weight of the unloaded vehicle without the cooperation of the compressor units. By having the shear members on either side of the centers of the connecting beams, the beams may move vertically under the lift of one or both axles. This provides for rocking movement of the tandem arrangement without the use of a pivoted rocker arm, and results in a much more universal and more flexible mount. Sidesway under these circumstances will be counteracted by the shear members initially, but increased movement will result in contact of the inboard pair of compression units on the side in the direction of sway. When the vehicle is loaded, it will settle lower bringing the inboard compression units into play. Still more load, or increased vertical movement of the axles will cause contact and compression of the outboard pair of compression units. The fact that the compression units are located centrally between the shear units helps materially in unifying the spring action, and the location of all of the compression units outboard of the shear units provides tremendously improved stabilization of the vehicle. In the assembly disclosed the progressively stepped outboard arrangement of the units furnishes a progressively wider support base in direct accordance with increasing load, and a progressively longer lever arm to resist overturning or sidesway movement in direct ratio to the force, or moment, of the movement.

The present suspension is a marked improvement over prior suspensions, and will provide trouble-free operation over long periods of time. Repair, or replacement, of the rubber units is simple and relatively inexpensive.

While in the above one practical embodiment of the invention has been disclosed, it will be understood that the details of construction shown and described are merely by way of example and the invention may take other forms within the scope of the appended claims.

What is claimed is:

1. A suspension for vehicles interposed between the vehicle frame and the vehicle running gear which includes a pair of axles comprising, a connecting beam between the axles of the pair at each end thereof, each beam being pivotally connected at its ends to the axles of the pair, a bracket mounted on each side of the vehicle frame and each having a vertically depending portion overlapping the connecting beam on the side of the vehicle on which it is located with the depending portions spaced horizontally from the connecting beam, a rubber shear spring unit, interposed between and having opposite faces connecting to each connecting beam and the overlapping bracket portion, a horizontal bench on each connecting beam and an overlying perch on each bracket, and a pair of rubber compression spring units with one unit of each pair being attached to the bench of each support and the other unit of each pair being mounted on the perch of each bracket in vertical alignment with the unit on the underlying support bench.

2. A suspension for vehicles as claimed in claim 1 wherein there is a second pair of rubber compression spring units mounted on each side of the vehicle with one unit of each pair on the bench and perch of each support and bracket in vertical alignment, the second pairs of rubber compression spring units being outboard of the vehicle relative to the first-mentioned pairs.

3. A suspension for vehicles as claimed in claim 1 wherein there are a pair of rubber shear spring units mounted between each connecting beam and the overlapping bracket portion, with the units of the pair of rubber shear spring units being mounted on opposite sides of the rubber compression spring units longitudinally of the connecting beams.

4. A suspension for vehicles interposed between the vehicle frame and the vehicle running gear which includes a pair of axles spaced longitudinally of the frame comprising, a connecting beam between the axles at each end thereof, each beam being pivotally connected at its ends to the axles of the pair, a bracket mounted on each side of the vehicle frame and each having depending pairs of legs straddling the connecting beams, with the legs of the pairs spaced from the connecting beams and the pairs of legs of each bracket being spaced apart longitudinally of the bracket so that the pairs of legs overlap the beams on either side of the longitudinal center of the beams, rubber shear spring units interposed between the beams and the legs of the depending pairs and having opposite faces connected to the beams and legs, said beams having benches projecting horizontally intermediate the overlapping pairs of legs, said brackets having horizontally projecting perches overlying the benches on the beams, a rubber compression spring unit mounted on each bench, and a rubber compression spring unit mounted on each perch in vertical alignment with the units on the underlying support benches.

5. A suspension for vehicles as claimed in claim 4, wherein the connecting beams are coupled together by a cross-tie connected at its ends to the beams by means allowing limited movement of the beams relative to the cross-tie and to each other.

6. A suspension for vehicles as claimed in claim 4 wherein there is a second pair of rubber compression spring units mounted on each side of the vehicle with the units of the second pairs connected to the respective benches and perches, the second pairs of rubber compression spring units being mounted outboard of the vehicle relative to the first-mentioned rubber compression spring units.

7. A suspension for vehicles as claimed in claim 6 wherein the connecting beams are coupled together by a cross-tie connected at its ends to the beams by means allowing limited movement of the beams relative to the cross-tie and to each other.

8. A suspension for vehicles interposed between the vehicle frame and the vehicle running gear which includes an axle comprising, a support carried by the axle, near each end thereof, a bracket mounted on each side of the vehicle frame, a rubber shear spring unit interposed between the support and bracket at each side of the vehicle and connected to the respective supports and brackets, pairs of rubber compression spring units between each support and bracket with the pairs of rubber compression spring units between each support and bracket being mounted so that they become operative sequentially under increased load and under sidesway of the vehicle, the pairs of rubber compression spring units being arranged transversely of the vehicle with the units of each pair spaced apart a greater distance progressively in a direction outboard of the vehicle.

References Cited in the file of this patent

UNITED STATES PATENTS

| | | |
|---|---|---|
| 2,063,758 | Schjolin | Dec. 8, 1936 |
| 2,482,488 | Julien | Sept. 20, 1949 |
| 2,663,570 | Hickman | Dec. 22, 1953 |
| 2,739,821 | Hickman | Mar. 27, 1956 |
| 2,756,048 | Pfeiffer | July 24, 1956 |
| 2,998,266 | Hickman | Aug. 29, 1961 |